(No Model.)
A. C. ROSENCRANZ.
PLOW POINT AND SHARE.
No. 562,244. Patented June 16, 1896.
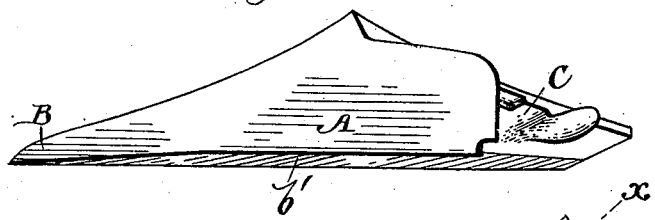
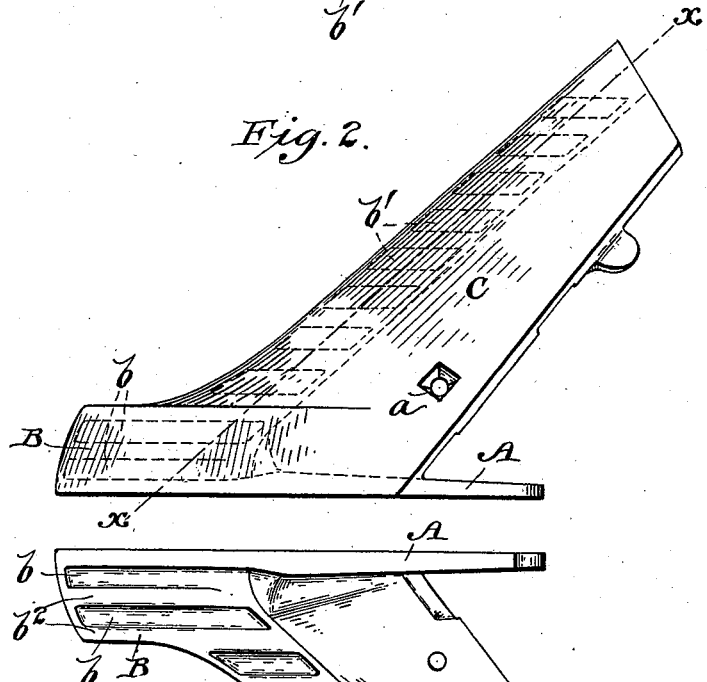
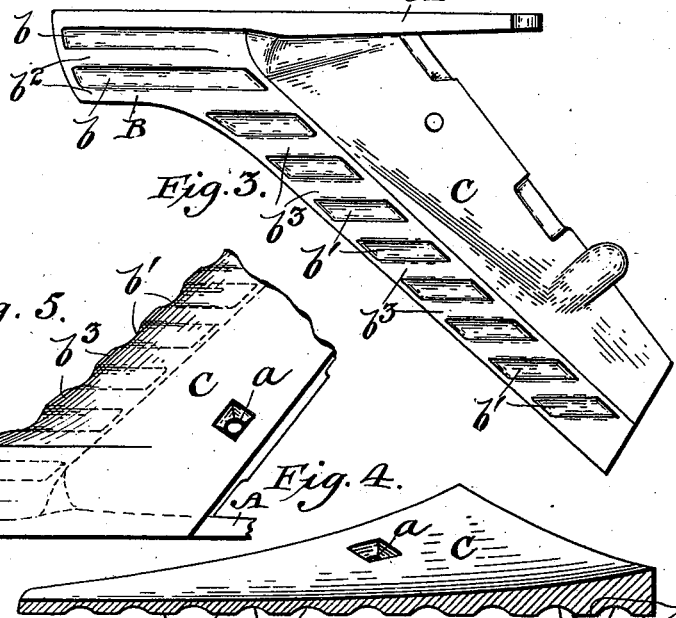
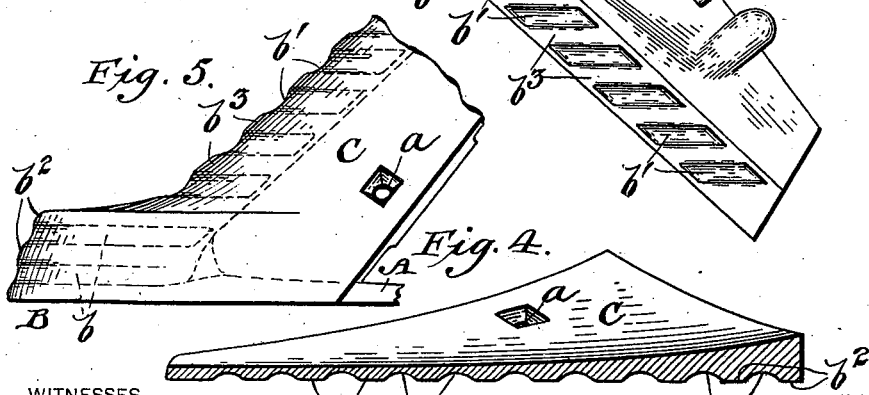
WITNESSES
INVENTOR
Albert C. Rosencranz
by his Attorneys
Mason, Fenwick & Lawrence

UNITED STATES PATENT OFFICE.

ALBERT C. ROSENCRANZ, OF EVANSVILLE, INDIANA.

PLOW POINT AND SHARE.

SPECIFICATION forming part of Letters Patent No. 562,244, dated June 16, 1896.

Application filed February 24, 1896. Serial No. 580,512. (No model.)

*To all whom it may concern:*

Be it known that I, ALBERT C. ROSENCRANZ, a citizen of the United States, residing at Evansville, in the county of Vanderburg and State of Indiana, have invented certain new and useful Improvements in Plow Points and Shares; and I do hereby declare the following to be a full, clear, and exact description of the invention, such as will enable others skilled in the art to which it appertains to make and use the same.

My invention relates specially to a combined share-point and landside of a moldboard-plow, but may be found useful in various styles of plows.

The improvement consists in a plow share and point constructed with a smooth upper surface and a transversely fluted, corrugated, or ridged under surface, whereby lightness and strength are secured, and a sharp serrated penetrating edge can be presented to the soil in a short time after the plow has been put into use; and also whereby the upper surface of the point and share are worn backward between the termini of the serrations, so as to present a slightly-waved inclined surface in rear of the serrated edge; and thus a sharp serrated edge is maintained.

By my invention the difficulty arising from using a uniformly thick, sharpened share and point, the edge of which gradually wears off and becomes uniformly blunt and dull from the point to the rear edge of the share, is avoided, inasmuch as those thinner portions of the share which are between the ridges, or which form the thicker portions of the share, wear away in such a manner as to always present a pretty sharp serrated penetrating edge; and thus the plow can be operated with less power and the work performed in a far superior manner to what it can be with a plow point and share which are not ridged, fluted or corrugated on their under side.

It will be understood that if ordinary plow points and shares were made throughout of a thinness corresponding to the thinner portions of my ridged, corrugated or fluted plow points and shares, they would not have the same strength as plow points and shares constructed with ridges which are of the usual thickness and serve for staying the points and shares at those points between the ridges where they are thinned down so as to leave the ridges.

In the accompanying drawings, Figure 1 is a side view of my plow point and share as viewed from the landside. Fig. 2 is a top view of the same, the ridged, fluted, or corrugated under surface being indicated by dotted lines. Fig. 3 is an inverted view of the point and share. Fig. 4 is a longitudinal section on the line $x$ $x$ of Fig. 2; and Fig. 5 is a a top view, part of the share and landside-bar broken away, showing the manner in which the serrated edge appears after a short use of the point and share in the soil.

In the drawings, A designates the landside portion of the plow-point, B the point proper, and C the share. The portions described are preferably made in one piece; and in the share a passage $a$, with a nut or bolt-head socket, is provided, as usual, in order to secure the share and point to the standard or to the frog. On the under side of the point and also of the share, depressions $b$ $b'$ are formed in the casting or molding of the plow. These depressions may be so formed as to give the point and share a corrugated, fluted, or ridged under surface, as illustrated in the drawings. The depressions lie between ridges $b^2$ $b^3$, which form the wearing or bearing surfaces of the point and share. In the drawings the depressions run transversely to the edge of the share, and are parallel with respect to the face of the landside portion of the point, and oblique with respect to the cutting edge of the share. By this arrangement of the depressions, or the ribs between which the depressions are formed, the friction is reduced, and the proper wearing of the edge into a serrated form, and the upper surface to a fluted form between the serrations, and the keeping of the serrated surface sharp by reason of such wear, are insured.

The wedge-shaped point or nose and the cutting edge of the plowshares are necessarily made thin in order to facilitate the penetration of the soil and the cutting of roots and the like; and in time the same become thick or dull by wear, and thereby the resistance or draft is increased, causing the plow to run unsteady and sometimes to rise out of the ground.

By corrugating, fluting, or ridging the under side of the plow point and share, as hereinbefore described and shown, these difficulties are avoided, as part of the metal is left thin, while the other portion or the ridges are thick and give strength; and as the edge wears back at the thinner portions it becomes serrated, and the upper surface becomes ridged or fluted by the grinding action of the soil sliding over it, which latter shape then adds to the cutting capabilities of the plow, especially in dry or difficult soil. At the same time the share is stayed by the ridges or flutes.

My plow point and share differs from all others in presenting a plain, smooth upper surface and a regular or unbroken cutting edge when new, but as it wears back the edge becomes serrated, and the upper surface slightly ridged or waved, presenting an inclined surface, thereby maintaining if not improving the cutting capabilities of the implement.

In casting the share and point it is preferable to leave a cutting-edge margin of about three-sixteenths of an inch back of the edge proper to insure a perfect casting by having the molten metal follow a straight or unbroken line along the chill that hardens the cutting edge. This margin is worn away after a few days' work in the soil and thereupon the serrated edge appears.

What I claim is—

1. A plowshare and point, constructed with transverse depressions and ridges, flutes or corrugations on the under side, extending nearly to the cutting edge of the share and point for the purpose of giving lightness and strength, and presenting at the start a sharp straight edge which in the use of the plow becomes serrated, substantially as described.

2. A plowshare provided with transverse depressions or ridges contiguous to its cutting edge on lines substantially parallel with the landside-bar, substantially as and for the purpose described.

3. A plowshare constructed with transverse depressions and ridges, flutes or corrugations on its under side contiguous to its cutting edge.

In testimony whereof I hereunto affix my signature in presence of two witnesses.

ALBERT C. ROSENCRANZ.

Witnesses:
GUSTAV SCHAUER,
ANDREW REED.